July 18, 1933. D. MILLINGTON 1,919,118
FORCED FEED LUBRICATOR
Filed Jan. 27, 1932 2 Sheets-Sheet 1
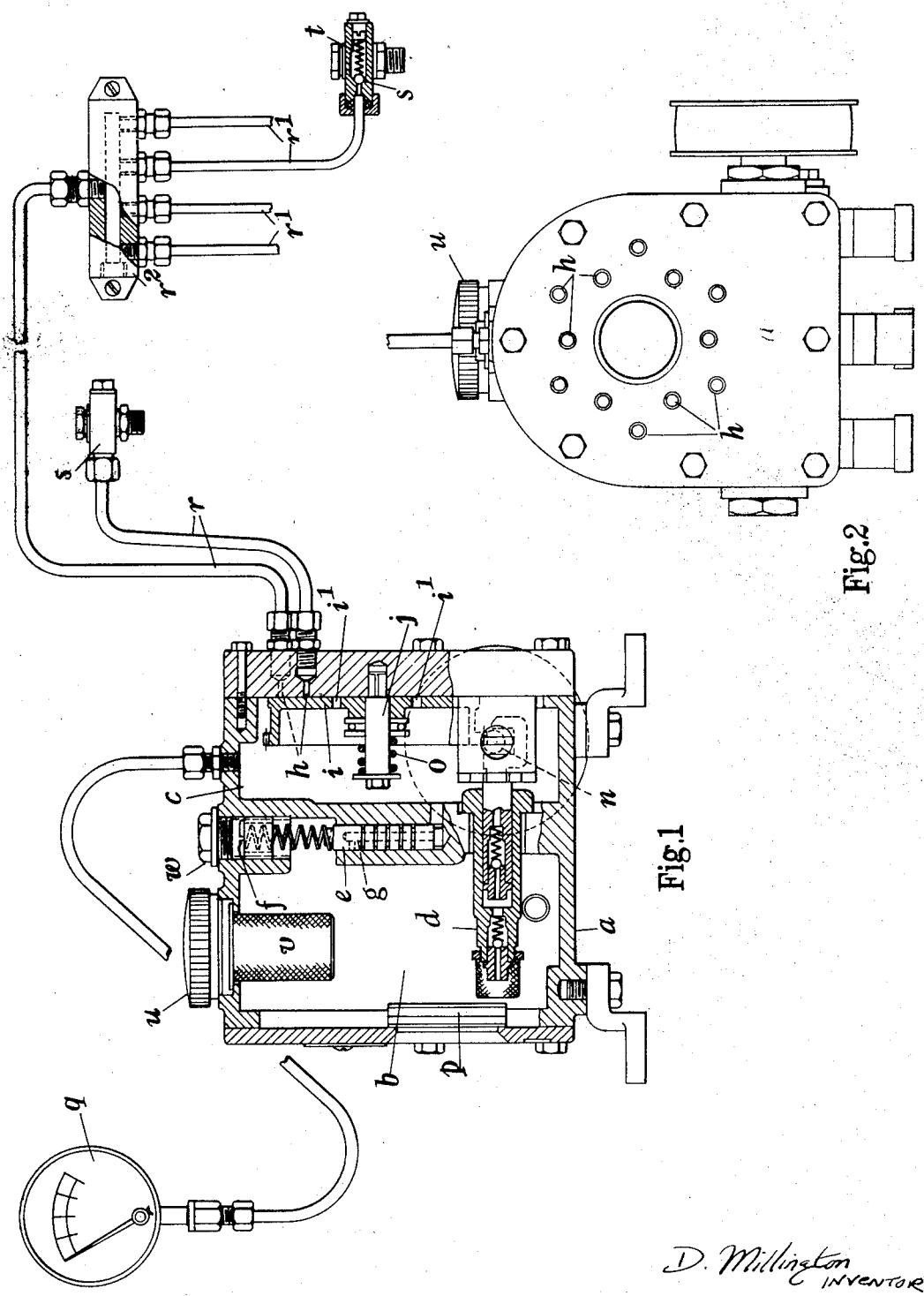

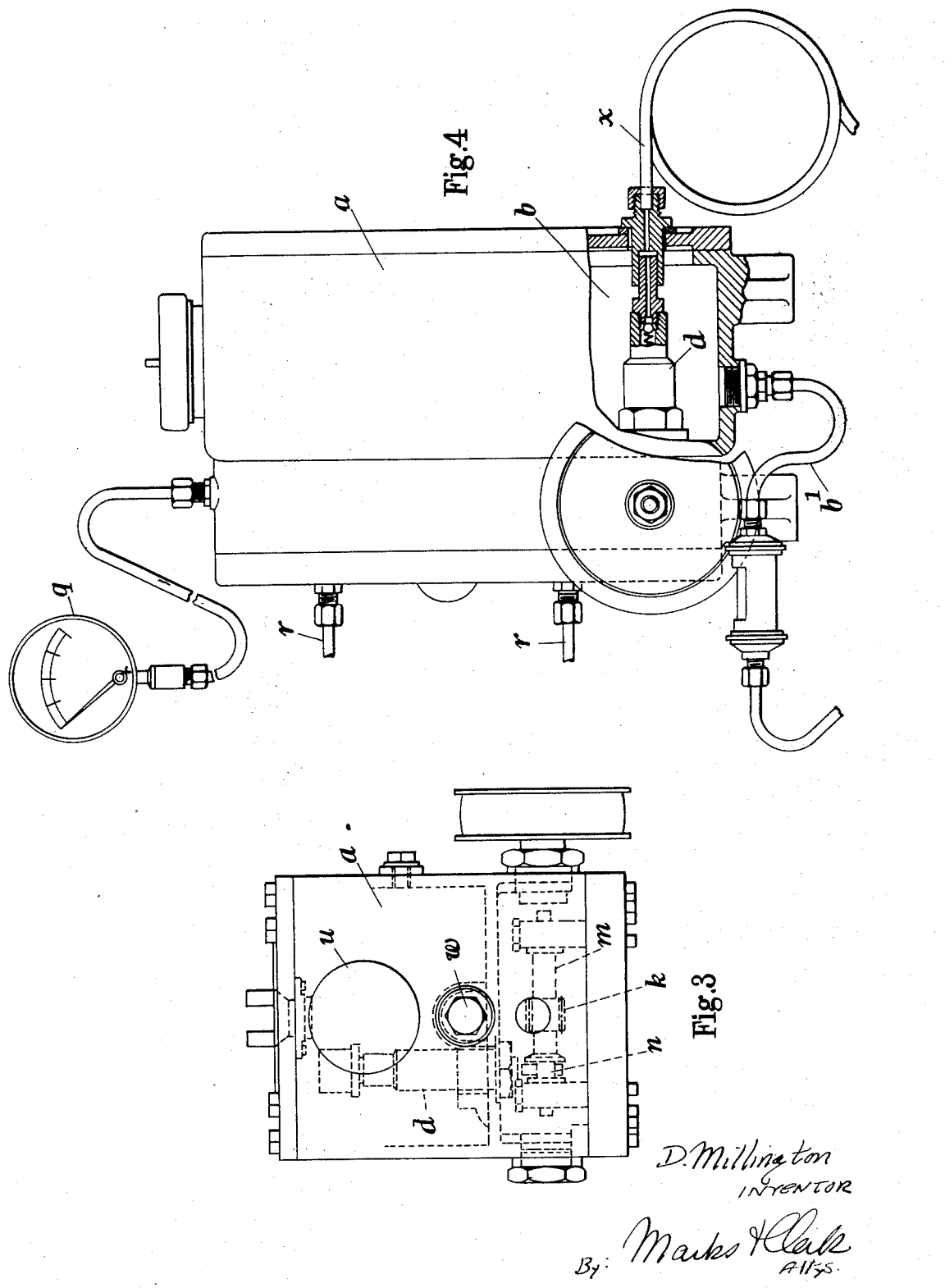

Patented July 18, 1933

1,919,118

UNITED STATES PATENT OFFICE

DAVID MILLINGTON, OF HUDDERSFIELD, ENGLAND, ASSIGNOR TO HOPKINSONS LIMITED, OF HUDDERSFIELD, ENGLAND, A BRITISH COMPANY

FORCED FEED LUBRICATOR

Application filed January 27, 1932, Serial No. 589,187, and in Great Britain January 30, 1931.

This invention relates to forced feed lubricators and comprises the improved combination and arrangement of parts hereinafter described and claimed for supplying lubricant to a large number of points in, if desired, very minute quantities.

Referring to the two accompanying sheets of explanatory drawings:—

Figure 1 is a sectional side elevation, Figure 2 a front elevation and Figure 3 a plan view of a forced feed lubricator constructed in accordance with my invention.

Figure 4 is a side elevation partly in section showing a modified arrangement in accordance with my invention.

The same reference letters in the different views indicate the same or similar parts.

The lubricator illustrated comprises a casing $a$ with therein a lubricant reservoir $b$ and a pressure or delivery compartment $c$ and with a pump $d$ drawing from the reservoir $b$ and delivering into said compartment $c$, a relief valve $e$ (which can be loaded to an adjustable extent by turning the screw $f$); allowing excess lubricant to return by its axial passage $g$ from the delivery compartment to the lubricant reservoir. One wall of the delivery compartment has a number of holes $h$ therein corresponding with the number of points to be lubricated and a disc type valve $i$ with holes therein is rotated by suitable means so as to bring its holes into coincidence successively with the fixed holes $h$ so as to allow lubricant to pass under pressure through the holes from the delivery compartment. The disc valve may be mounted upon a central stud $j$ and be rotated by a worm $k$ upon the spindle $m$ having the crank pin $n$ thereon which reciprocates the pump $d$.

The rotary disc valve $i$ is held upon the wall of the lubricant delivery compartment $c$ with the holes $h$ therein by the oil pressure in the said compartment, but I provide a light spring $o$ bearing upon the disc to hold the latter against the said wall at starting, when there may be no oil pressure available. Holes as $i^1$ in the disc serve to limit the pressure between the disc and the wall over which it rotates.

The holes $h$ in the delivery compartment wall may be in any desired number of concentric circles and the disc have one or more holes therein to co-operate with the holes in each circle.

By varying the load upon the relief valve $e$ between the delivery compartment $c$ and the lubricant reservoir $b$, I may ensure the maintenance of any desired pressure in the delivery compartment, for the lubricant pump is adapted to supply to such compartment more lubricant than can be passed through the holes $h$ as they are periodically uncovered.

The lubricant reservoir $b$ has a level gauge $p$ thereon and the delivery compartment a pressure gauge $q$.

The holes $h$ in the delivery compartment wall are connected by pipes as $r$ secured in such holes with the points where lubricant is to be supplied. Each pipe may deliver directly into a lubricant cap or the like upon the bearing or part to be lubricated or each pipe may have a spring loaded valve, as shown at $s$ thereon to ensure that the pipe is maintained fully charged with lubricant and that delivery takes place only when the hole $h$ supplying the pipe is uncovered by the disc $i$. The compression of the spring $t$ upon the valve $s$ may be adjusted to regulate the amount of lubricant delivered through the valve. As shown at the right of Figure 1, one pipe $r$ supplies several subsidiary pipes $r^1$ through a header $r^2$. Each of the pipes $r^1$ may have a spring loaded valve $s$ thereon.

The shaft $m$ driving the disc valve $i$ and the lubricant pump $d$ may be belt driven from any convenient part of the machine or engine being lubricated, or may be rotated by hand through a one-way clutch. The reservoir $b$ has a filler cap $u$ thereon with a filter $v$ for the inserted oil. The screw $f$ for adjusting the compression of the spring loading of the relief valve $e$ is protected by a cap $w$. The holes $h$ in the wall of the delivery compartment may be arranged in any convenient manner to suit requirements.

If the lubricant or reservoir $b$ has not sufficient capacity for the number of lubricating points fed by the delivery compartment $c$, then the pump $d$ may be directly connected as by the pipe $x$, Figure 4, with a large container, and the chamber $b$ then serves as an overflow chamber for the delivery compartment $c$, the surplus lubricant leaving the chamber $b$ by the pipe $b^1$. The apparatus is otherwise the same as that illustrated in Figures 1-3.

What I claim is:

1. The combination in a forced feed lubricator of, a casing with a lubricant reservoir and a delivery compartment therein, a plurality of delivery holes in a wall of said delivery compartment, a disc valve with one or more holes therein rotated to bring its holes into coincidence with the delivery holes, a reciprocating pump drawing from said reservoir and delivering into said compartment more lubricant than can pass through said delivery holes as they are periodically uncovered by the hole or holes in said disc valve, a relief valve allowing the excess lubricant to return from the delivery compartment to the reservoir, the pressure in the delivery compartment holding said disc valve in good contact with the face of the apertured wall over which it rotates, a light spring pressing upon said disc valve to hold it initially on said face in the absence of delivery pressure, and a shaft rotating said disc valve and reciprocating said pump.

2. The combination in a forced feed lubricator of, a lubricant container, a casing with a lubricant reservoir and a delivery compartment therein, a plurality of delivery holes in a wall of said delivery compartment, a disc valve with one or more holes therein rotated to bring its holes into coincidence with the delivery holes, said lubricant reservoir constituting an overflow for said delivery compartment, a pipe between said lubricant container and said delivery compartment, a reciprocating pump drawing from said lubricant container and delivering into said delivery compartment more lubricant than can pass through said delivery holes as they are periodically uncovered by the hole or holes in said disc valve, a relief valve allowing the excess lubricant to pass from said delivery compartment to said lubricant reservoir which constitutes an overflow therefor, the pressure in the delivery compartment holding said disc valve in good contact with the face of the apertured wall over which it rotates, a light spring pressing upon said disc valve to hold it initially on said face in the absence of delivery pressure, and a shaft rotating said disc valve and reciprocating said pump.

DAVID MILLINGTON.